(12) United States Patent  
Larson

(10) Patent No.: US 6,229,514 B1  
(45) Date of Patent: May 8, 2001

(54) DISPLAY DEVICE AND METHOD FOR VISUALIZING COMPUTER GENERATED IMAGE INFORMATION

(75) Inventor: Ove Larson, Västra Frölunda (SE)

(73) Assignee: Array Printers Publ. AB, Vastra Frolunda (SE)

( * ) Notice: Subject to any disclaimer, the term of this patent is extended or adjusted under 35 U.S.C. 154(b) by 0 days.

(21) Appl. No.: 09/079,659

(22) Filed: May 15, 1998

Related U.S. Application Data

(63) Continuation-in-part of application No. 08/553,720, filed on Nov. 13, 1995, now abandoned, and a continuation-in-part of application No. 08/749,958, filed on Nov. 18, 1996, now Pat. No. 5,854,614.

(51) Int. Cl.[7] ..................................................... G09G 3/36

(52) U.S. Cl. ............................................ 345/101; 349/155

(58) Field of Search .............................. 345/90, 101, 106, 345/55, 60, 67, 69, 87, 205, 92, 88; 349/155, 86, 84, 89, 90

(56) References Cited

U.S. PATENT DOCUMENTS

| | | | |
|---|---|---|---|
| 3,354,565 | 11/1967 | Emmons et al. | 40/450 |
| 3,410,399 | 11/1968 | Hunter | 209/5 |
| 3,637,291 | 1/1972 | Kesler et al. | 350/160 |
| 3,877,008 | 4/1975 | Payne | 345/106 |
| 3,897,643 | 8/1975 | Morris, Jr. et al. | 40/450 |
| 4,034,187 * | 7/1977 | Tomioka et al. | 219/216 |
| 4,277,145 | 7/1981 | Hareng et al. | 249/20 |
| 4,501,503 | 2/1985 | Buirley et al. | 374/162 |
| 4,514,045 | 4/1985 | Huffman et al. | 349/21 |
| 4,514,736 * | 4/1985 | Moriguchi et al. | 346/76 |
| 4,525,708 | 6/1985 | Hareng et al. | 345/101 |
| 4,598,978 | 7/1986 | Mourey et al. | 349/21 |
| 4,641,924 | 2/1987 | Nagae et al. | 349/21 |
| 4,673,256 | 6/1987 | Hehlen et al. | 349/21 |
| 4,682,605 | 7/1987 | Hoffman et al. | 600/549 |
| 4,763,136 | 8/1988 | Isobe | 346/76 R |
| 4,837,071 | 6/1989 | Tagoku et al. | 428/195 |
| 4,922,242 | 5/1990 | Parker | 345/106 |
| 4,995,705 | 2/1991 | Yoshinaga et al. | 349/22 |
| 5,040,879 | 8/1991 | Haven | 349/21 |

(List continued on next page.)

FOREIGN PATENT DOCUMENTS

| | | |
|---|---|---|
| 2349234 | 6/1974 | (DE) . |
| 1330420 | 9/1973 | (GB) . |
| 1453984 | 10/1976 | (GB) . |
| 63-253393 | 10/1988 | (JP) . |
| 63-29795 | 1/1990 | (JP) . |
| 357879 | 11/1973 | (SE) . |
| 396826 | 2/1976 | (SE) . |
| WO 92/01565 | 7/1991 | (WO) . |
| WO 94/26528 | 5/1995 | (WO) . |

*Primary Examiner*—Vijay Shankar  
*Assistant Examiner*—Vanel Frenel  
(74) *Attorney, Agent, or Firm*—Knobbe, Martens, Olson & Bear, LLP

(57) ABSTRACT

A display for digital/analogous visualization of computer stored and bitmapped, in the form of still or moving patterns, (e.g., text or images) or the like, on or by way of at least one visualization medium. The display consists of one matrix including at least two sets of electrodes, wherein the electrodes cross each other. The electrodes are distanced from each other by at least one resistive and/or inductive spacer, and are connected to at least one control device for multiplexing, scanning or pulsating the control signals. The electrodes are individually addressable in accordance to electric signals from a control unit and are provided so that when selected electrodes in both sets of the electrodes are energized, a temperature change (heat) is conducted towards the medium. The medium includes a thermosensistive indicator (e.g.) a layer, or a body. The surface/surfaces in the display are provided to transform the temperature change to visible dots.

29 Claims, 12 Drawing Sheets

U.S. PATENT DOCUMENTS

| | | |
|---|---|---|
| 5,128,662 | 7/1992 | Failla ................................... 345/1 |
| 5,140,448 | 8/1992 | Bone et al. ......................... 349/166 |
| 5,144,464 | 9/1992 | Ohnishi et al. ..................... 349/20 |
| 5,202,677 | 4/1993 | Parker et al. ....................... 349/21 |
| 5,296,952 | 3/1994 | Takatsu et al. ..................... 349/77 |
| 5,343,318 | 8/1994 | Basturk .............................. 349/22 |
| 5,486,941 | 1/1996 | Saiuchi et al. ..................... 349/155 |
| 5,548,420 | 8/1996 | Koshimizu et al. ................ 349/21 |
| 5,620,781 | 4/1997 | Akashi et al. ..................... 428/195 |
| 5,758,079 * | 5/1998 | Ludwig et al. ................ 395/200.34 |
| 5,764,241 * | 6/1998 | Elliott et al. ..................... 345/473 |
| 5,977,913 * | 11/1999 | Christ ................................ 342/465 |

* cited by examiner

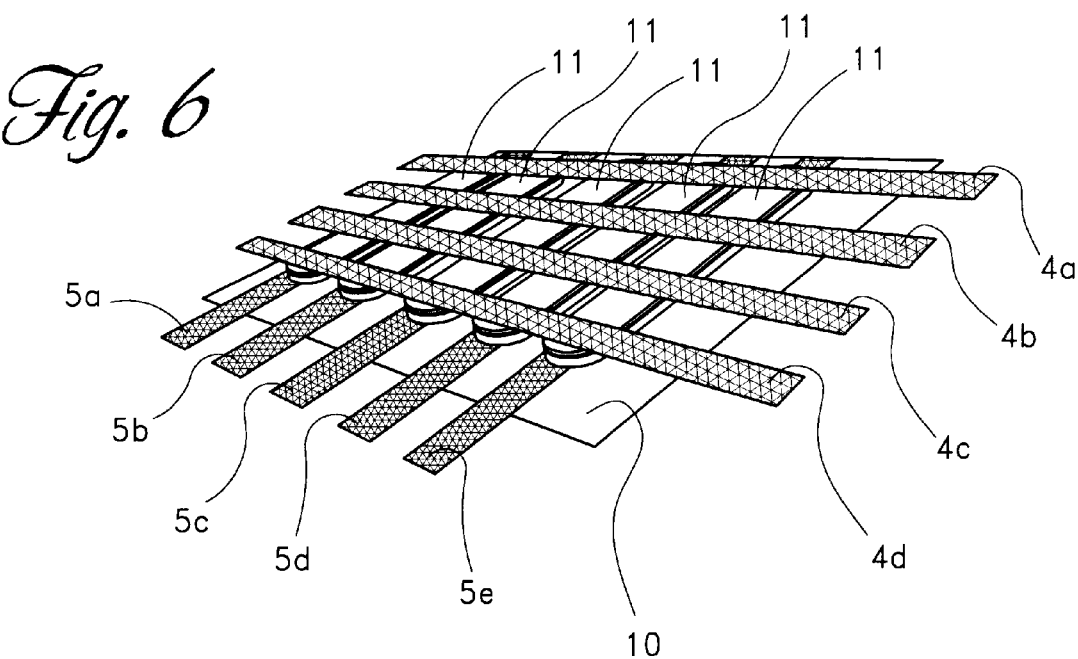
Fig. 6
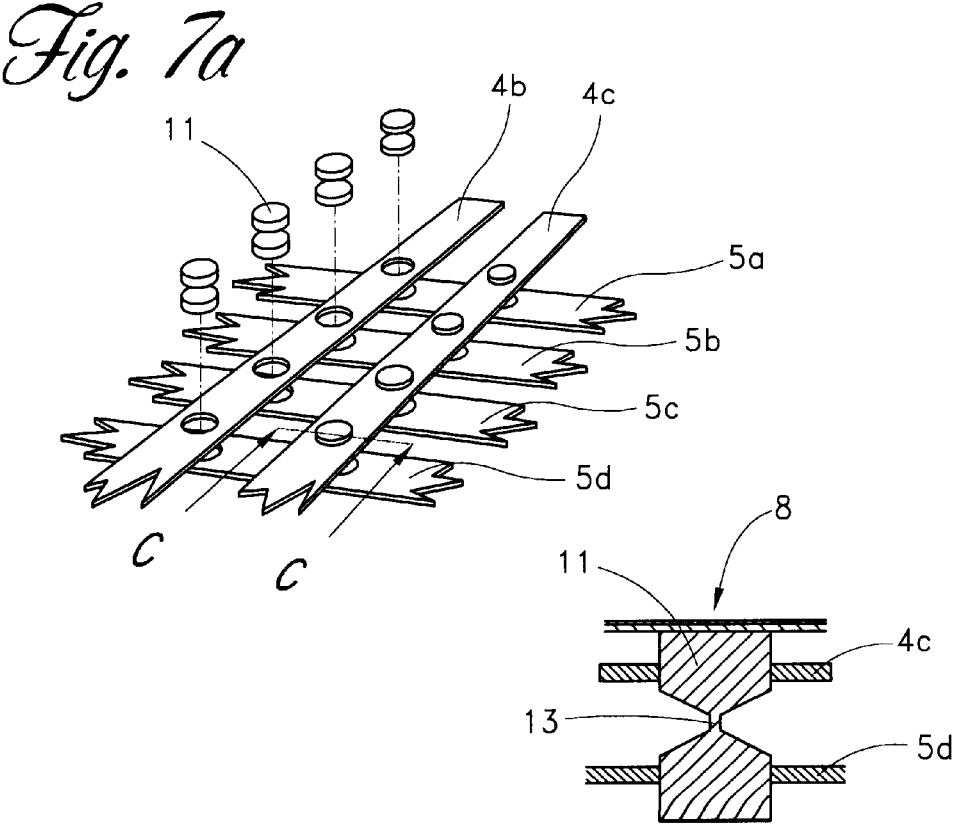
Fig. 7a
Fig. 7b

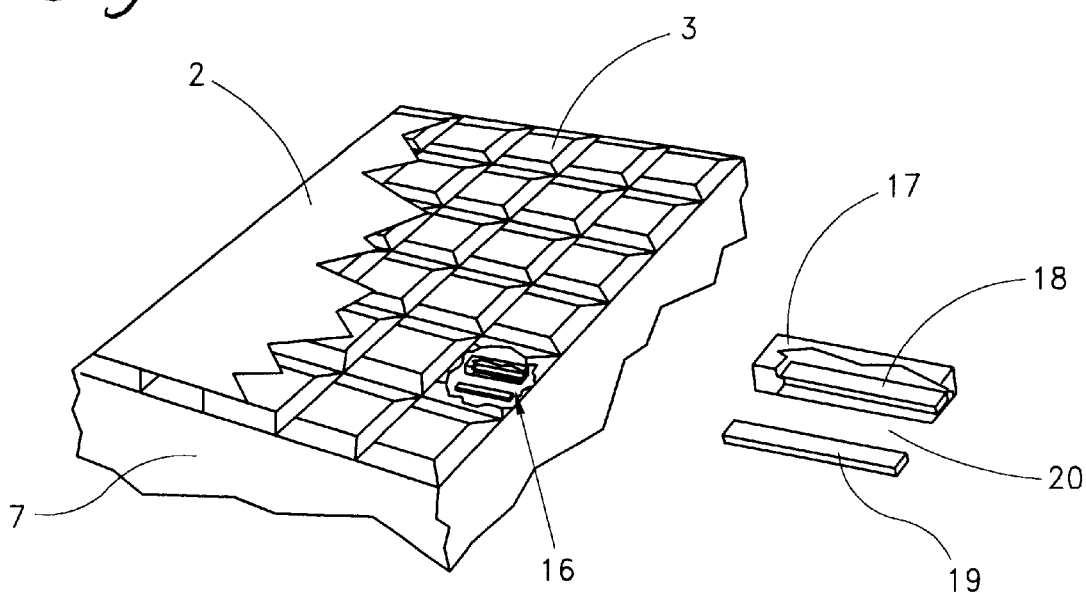
Fig. 8a
Fig. 8b
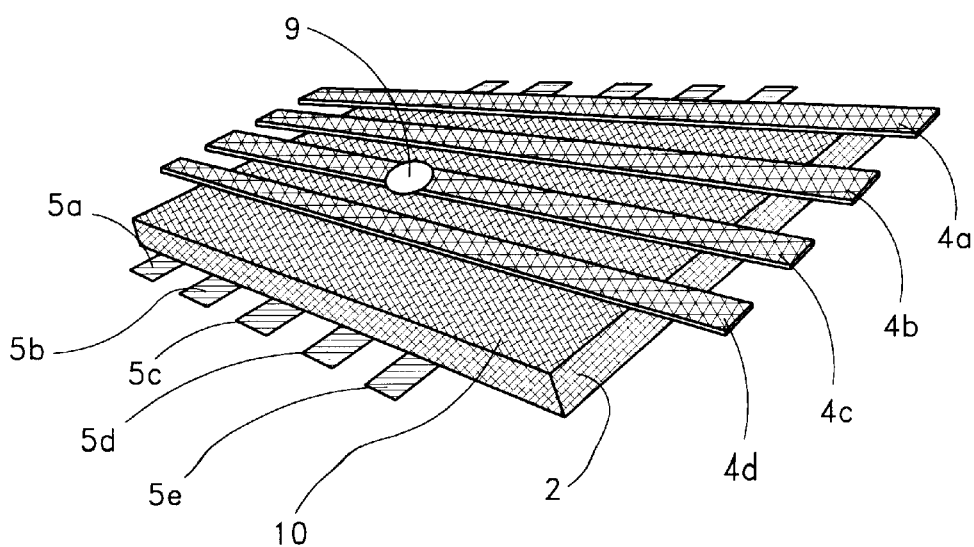
Fig. 9a

DISPLAY DEVICE AND METHOD FOR VISUALIZING COMPUTER GENERATED IMAGE INFORMATION

The present application is a continuation-in-part of U.S. patent application Ser. No. 08/553,720, filed on Nov. 13, 1995, abandoned and a continuation-in-part of U.S. patent application Ser. No. 08/749,958 filed on Nov. 18, 1996 now U.S. Pat. No. 5,854,614. The contents of those applications, in their entirety, are hereby incorporated by reference.

BACKGROUND OF THE INVENTION

1. Field of the Invention

The present invention refers to a display for digital/analogous visualization of computer stored and bitmapped still or moving images on or by means of at least one visualization medium, the display consisting of a matrix including at least two sets of individually addressable electrodes, being arranged in rows and columns having crossing points and being connected to at least one control unit, for multiplexing, scanning or pulsating control signals from the control unit, whereby a temperature variation is obtained in the crossing points of the electrodes, which temperature variation is conducted towards a medium, substantially including a thermosensitive indication means for transforming the temperature change to visible dots.

2. Description of the Related Art

In certain applications, such as price indicators in shops, information indicators at shop windows or the like, advertising signs and other fields requiring visualization of information, there is a need for a display means, which can be manufactured in large quantities with low cost. The major problems with the LCD (Liquid Crystal Display) and TFT (Thin Film Transistor) screens are that a large number of displays are discarded due to sensitivity of the manufacturing process.

It is known in the art to write visual information on a thermosensitive display medium, where the medium becomes transparent when heated and opaque when cooled down or when heated above a certain temperature. The thermosensitive material of such a medium is also referred to as a thermochromatic material. The visualization materials used in thermosensitive displays are generally liquid crystals, for example encapsulated liquid crystals, which become transparent when heated, thus enabling incident light to be transmitted through the medium.

The international patent application WO 94/26528 discloses a display for the visualization of still or moving images, where temperature changes are produced by a pattern of resistive elements and transformed to visible dots in a visualization medium. The display comprises a matrix having at least two sets of electrodes, which sets cross each other and are distanced from each other by means of at least one resistive and/or inductive spacer means. The electrodes are arranged in rows and columns, which do not necessarily have to be perpendicular to each other. The matrix is further connected to at least one control device for multiplexing, scanning or pulsating the control signals. The electrodes are individually addressable according to the electric signals from the control unit and are arranged so that, when the selected electrodes in both sets of electrodes are energized, temperature changes are obtained at the cross points of the charged electrodes. The temperature changes (heat) are conducted towards the display medium, which comprises a thermosensitive indication means, such as a layer, a body or the like. The surfaces of the display then transform the temperature changes to visible dots or the like.

U.S. Pat. No. 4,837,071 discloses an information display medium comprising a thermosensitive material layer which can reversibly repeat turbid (opaque) and transparent conditions by being heated to different temperatures, and can keep one of the conditions stably below a particular temperature. The thermosensitive material layer is backed by a colored layer, another layer and a background panel. At least one of the mentioned layers is colored in different color patterns. The temperature of the thermosensitive material layer is controlled for displaying an image in a combination of different colors.

The document WO 92/01565 discloses an erasable optical display medium for colored visual information, which display medium comprises a substrate carrying a heat-sensitive film which can be converted to different optical states (opaque/transparent) under the influence of temperature. These states are permanent at normal ambient temperature (room temperature) and reversible by heating to specific temperatures. The display medium is designed to have a matrix of dots, the dots being combined into groups of four dots, where each of the four dots has a different primary color (e.g., red, yellow, blue or black). If the heat-sensitive film over a dot is converted, by appropriate warming, to the transparent state, the dot underlying the film becomes visible. This makes it possible to display colored data on the display medium.

U.S. Pat. No. 3,637,291 shows a display in which enclosed liquid crystals are used as image carrying medium, which crystals have two optical states, i.e., a first translucent state and another opaque state. The crystal layer becomes translucent first when it is exposed to a momentary electric field, since the visible image is created by increasing the temperature in the desired points, which become opaque. This device consists of many parts to be controlled, and the control method includes several stages for production of a visible dot.

Through U.S. Pat. No. 4,922,242, a visualization means for visualization of a pre-manufactured form is known. The visualization means consists of two electrodes with a resistive layer between them. A thermochromatic layer is provided between a pigment layer and a transparent polymeric layer. The image, such as a digit to be shown, is cut out as a metallic mesh. When an electric current passes through the electrodes, the resistive layer is warmed up. The heat is guided to the thermochromatic layer, which becomes translucent due to the heat, whereby the pigment layer becomes visible. This type of display is not flexible, must be formed in a predetermined shape, and cannot show moving images.

U.S. Pat. No. 3,410,999 discloses a display screen which includes a layer of liquid crystalline material of the cholesteric phase in which a temperature image is applied thereto according to electrical information by means of glossy elements provided in intimate contact with the liquid crystalline material. The display according to this document uses a liquid crystalline material of the cholesteric phase in which the brightness of the display is proportional to the amount of viewing light including ambient lighting directed onto the screen. The liquid crystalline material of the cholesteric phase exhibits curious changes in light reflecting properties when heated or cooled through a transition region near their melting point. Thus, the display according to this document uses the changes in reflectivity (changes in color). The display also needs a cooling arrangement.

SUMMARY OF THE INVENTION

It is an object of the present invention to provide an information display device and a method for visualizing computer generated image information, while minimizing the energy used for this process.

A further object of the invention is to provide an information display device for visualizing computer generated image information, which is capable of displaying an image using gradual color-scale or grey-scale.

A further object of the present invention is to provide a display for still and moving images, for example, consisting of characters and/or patterns, which display can be manufactured in a simple way and with low cost. The display has few parts and can be flexible for certain applications, such as for wound types.

To achieve these objects, an information display device according to the present invention includes as main components a thermosensitive material layer which can be gradually converted between a first optic state and a second optic state under the influence of temperature; an electrode matrix; and a control device for multiplexing, scanning or pulsating control signals to the individually addressable electrodes, possibly together with a colored backing layer. The electrodes in the matrix are connected via heating means at the electrode crossing points. At each crossing point, there is further positioned a current valve means (diode) or a separate driver circuit for each heating means.

These tasks have been solved by spacing the electrodes apart from each other by means of at least one resistive and/or inductive spacer means, and intermittently applying the control signals to the electrodes with an amount of energy per time unit, so that an indicated heat, i.e., visible dot, is remained until the next update of the display.

The above and other objects, features and advantages of the present invention will become more apparent from the following description when read in conjunction with the accompanying drawings in which preferred embodiments of the present invention are shown by way of illustrative examples.

BRIEF DESCRIPTION OF THE DRAWINGS

In the following, the invention will be described by referring to a number of embodiments, and attached drawings, in which:

FIG. 1b shows a section along the line A—A in FIG. 1a;

FIG. 2b is a cross section along the line B—B in FIG. 2a;

FIG. 6 is a perspective view of a embodiment of the resistive spacers arranged between the electrodes;

FIG. 7a shows in perspective an additional embodiment of the resistive spacers;

FIG. 7b shows a cross section along the line C—C in FIG. 7a;

FIG. 8a shows in perspective a matrix arranged with transistors;

FIG. 8b shows an enlarged view of the transistor of the matrix;

FIG. 9a is a perspective view of a part of a matrix having translucent electrodes in both sets of the electrodes;

FIG. 9b shows a cross section through a crossing point of the matrix according to FIG. 9a;

DETAILED DESCRIPTION OF THE PREFERRED EMBODIMENT

The basic idea of the invention is that in individually addressable, limited areas (e.g., dots), temperature changes, preferably temperature increases, influence a thermosensitive material in a visualization medium, which visualizes the dots according to a desired pattern.

Figure 1A:
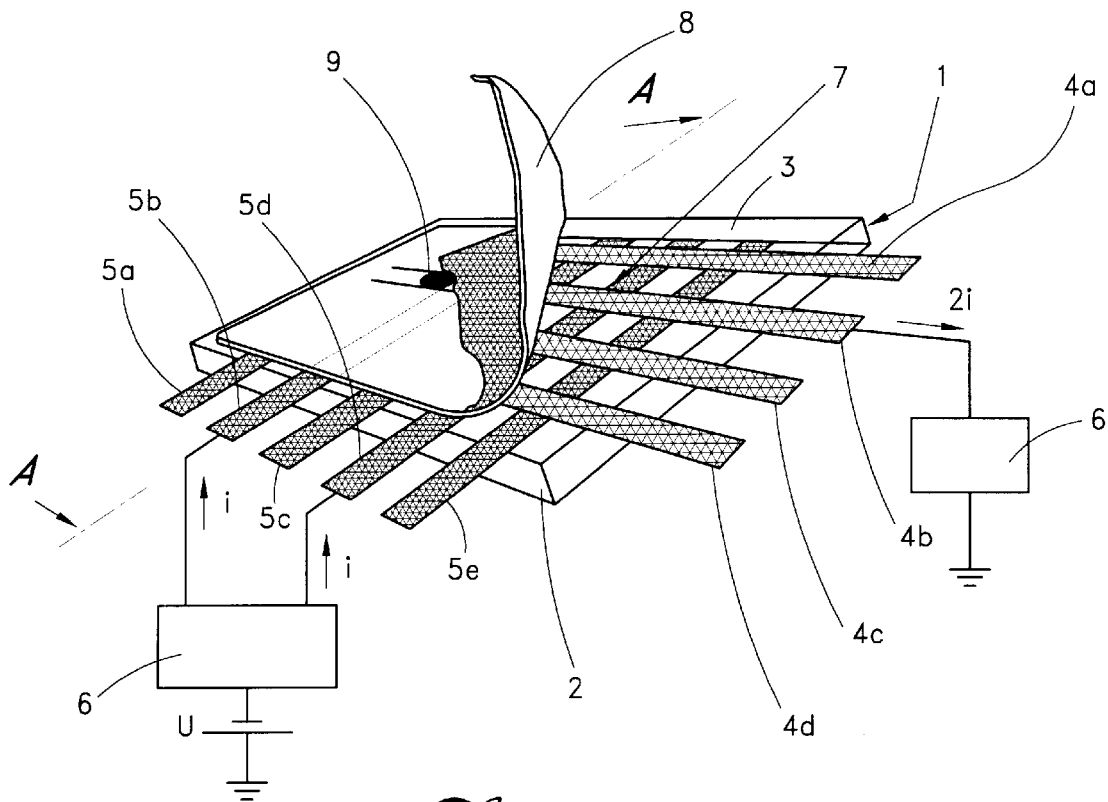
FIG. 1a in perspective shows a first embodiment of a portion of a visualization means according to the invention, with the visualization medium partly folded.
Figure 1B:
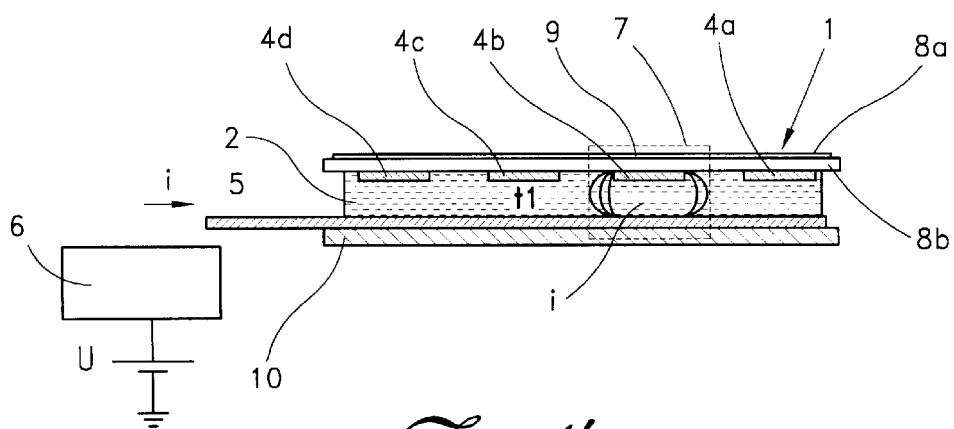

In one embodiment shown in FIGS. 1a and 1b, the visualization means consist of a matrix 1, including a resistive spacer means shaped as a plate 2 made of semiconductor material. A first set of electrodes 4 are provided in parallel rows on the one flat side of the plate 2, and another set of electrodes 5 are provided likewise in parallel rows, but arranged substantially perpendicular to the first set of the electrodes and placed on the other flat side of the plate 2. The sets of electrodes 4, 5 are consequently provided in X and Y coordinates, but the angles between these do not need to be 90 degrees, but can have other magnitudes. All electrodes are connected to control units 6, e.g., integrated driving circuits, which are programmed so that each electrode of the first set of electrodes 4 is individually connectable to a voltage source U, while each electrode in the other set of electrodes 5 is individually connectable to ground. For example, if the electrodes 5b and 5d are connected to the voltage U and the electrode 4b is connected to ground via the resistive plate 2, in the crossing point between said electrodes in the plate, heat is produced within a limited space 7, which is shown with the cylinder. The heat is distributed to the heat surface 3 of the matrix 1, while its opposite surface is insulated against the heat by means of an insulating plate 10. The control of the matrix can be arranged by multiplexing the voltage signals.

The control voltage to the electrodes can be pulsated. That is, each selected crossing point arranged to show a dot is pulsated with an amount of energy per time unit so that its generated heat remains until the screen is updated next time.

The pulsating can be carried out by addressing each point continuously with voltage and/or current pulses, switching on/off the dot by changing the dot address or multiplexing or scanning.

Instead of using wire or ribbon shaped electrodes, it is also possible to make the electrodes 4, 5 by printing an electric conducting medium, for example, silver dye, water/glass or the like.

When the visualization means is used as a display or the like, a visualization medium 8 is placed in a heat conducting contact against this. The visualization medium 8 partly comprises a temperature sensitive indication layer 8a, which transforms the spot heat to a visible dot 9, for example, as a color change, and partly a heat receiving surface 8b. It is also possible to show the visualized pattern in color by controlling the voltage to the electrodes, by means of the control unit 6 and thereby the temperature in the crossing points of the electrodes. In this case, a reversible thermodye is used as a temperature sensitive indication layer 8a, which in respect of the temperature assumes different colors.

Figure 16:
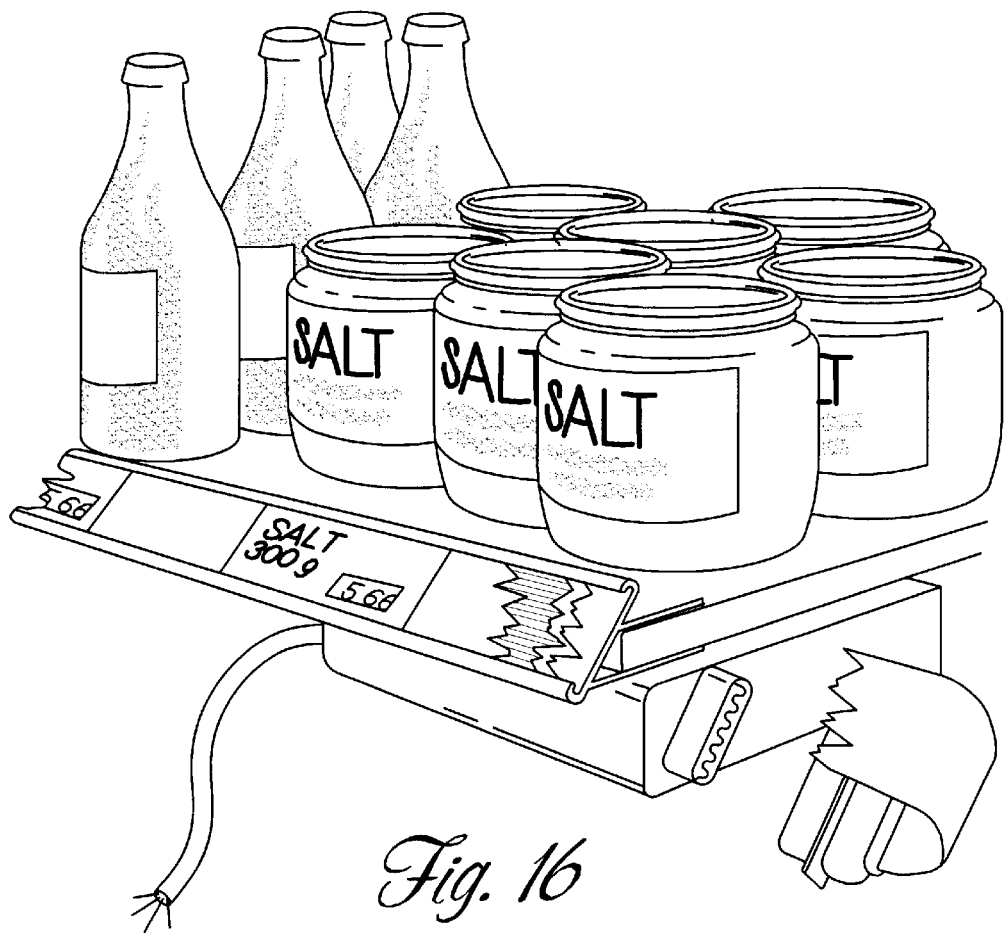
FIG. 16 shows, in perspective, utilization of the visualization means for shelf marking.

By intermittently energizing the electrodes 4, 5 of the matrix 1, information can be visualized during a long time, which makes it possible to use the display, e.g., as product and price information sign on shelves, as shown in FIG. 16. The heat conduction causes a delayed turn off, which permits multiplexing through a scanning procedure.

Figure 2A:
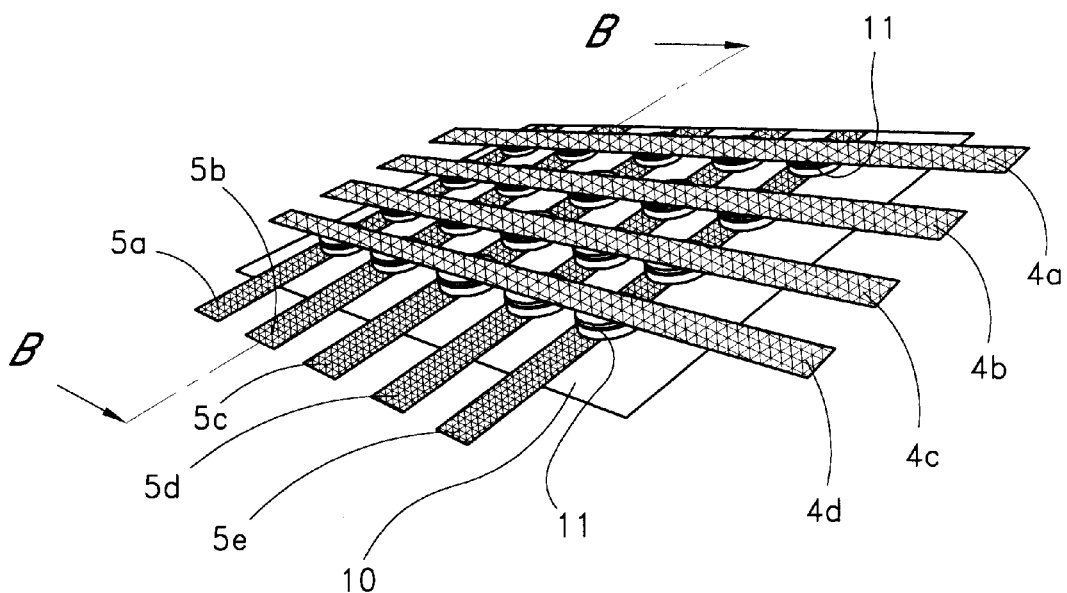
FIG. 2a shows a perspective view of another embodiment of a portion of a matrix included in the device.
Figure 2B:
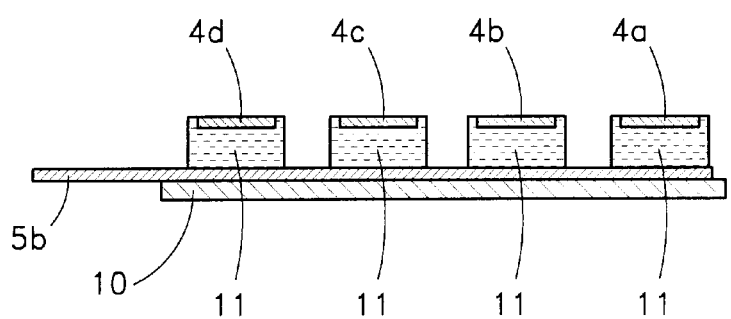

In a modified embodiment of the invention according to FIGS. 2a and 2b, the semiconductor plate is replaced by semiconductor pellets 11, possibly provided in a poor heat conducting plate (not shown) whereby a more distinct spot heat is received by the heat emitting surface 3.

Figure 3:
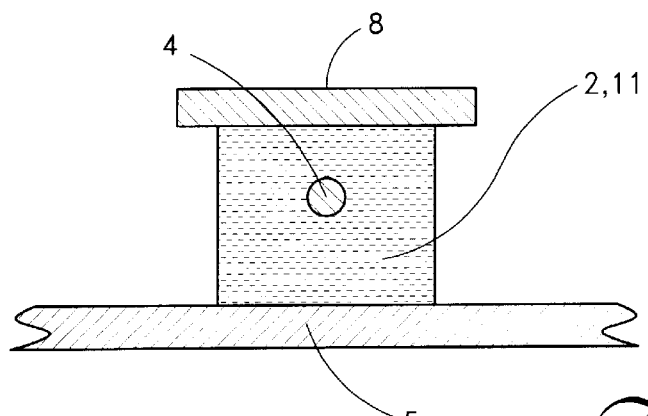
FIGS. 3, 4 and 5b show an enlarged cross section through the electrodes of the matrix having different types, forms and properties.
Figure 4:
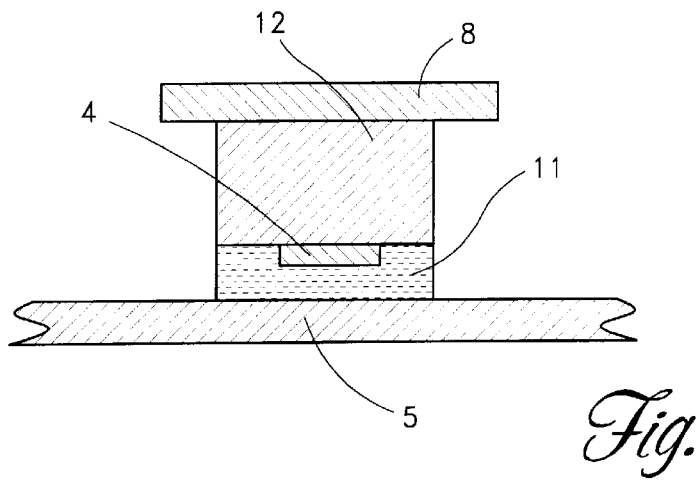
Figure 5A:
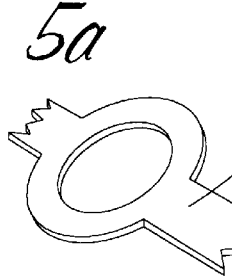
FIG. 5a shows a perspective view of a part of the upper electrode used in FIG. 5b.
Figure 5B:
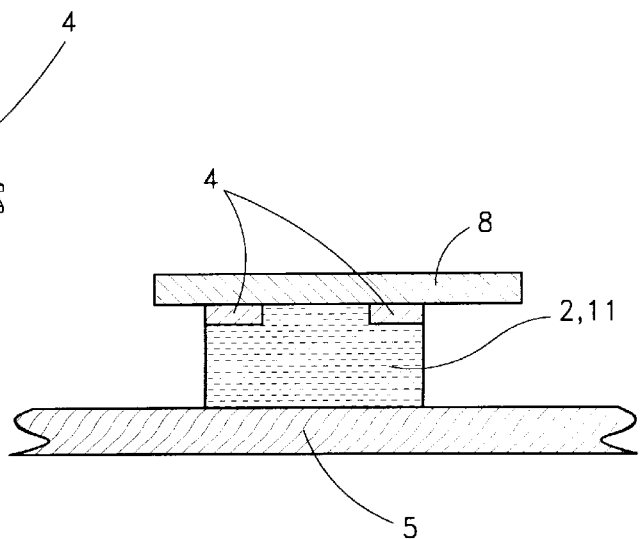

As it appears from FIGS. 3, 4 and 5b, the electrodes are arranged in different ways, but even their cross-section can have a form adapted for the application. Accordingly, the electrodes in FIG. 3 have circular cross-sections, and one of the electrodes 4 of the set of the electrodes is placed inside the pellet 1 and the plate 2, respectively. From FIG. 4, it appears that the plate 2 or the pellets 11 can be divided in two parts, whereby in one lower part, the electrode 4 is inserted and the part consists of a semiconductor material, while the upper part 12 forms a good heat conductor, which transports the heat to the visualization medium 8. If needed, the electrodes can also be given a certain form, such as the one shown in FIG. 5b.

FIG. 6 shows an embodiment in which the resistive spacer 11 extends over several electrodes 4a–4d in a set of electrodes.

In FIGS. 7a and 7b, the resistive spacer 2 has a strong radial area reduction 13, which causes a notable increase of the resistance, which in turn results in heat generation in this part.

The spot heating of the matrix 1 may also be achieved by providing it with transistors 16, in accordance with the embodiment shown in FIGS. 8a and 8b, where 17 designates the base of the transistor, 18 the emitter, 19 the collector and 20 the resistor. In this case, the transistors are first used as local heating sources, which emit their heat to the heat emitting surface 3 of the matrix, which consist of several cone or pyramid shaped elevations for each transistor.

In the embodiment according to FIG. 9a, the visualization medium 8 is integrated in the plate shaped resistant spacer 2. In particular, the temperature sensitive, reversible indication materials 8a, which can be micro-encapsulated liquid crystals, are by means of a binding agent, such as a semiconducting plastic material, integrated into a plate 2, against which the set of electrodes 4, 5 bear on. To be able to see the visible heat dots through the electrodes, they must be transparent, e.g., made of $In_2O_3(SnO_2)$.

The resistive or heat producing layer 2, for example can consist of DAP (Diallyl Phthalate, COSMIC PLASTIC INC., USA). The layer 2 can also consist of a transparent thermoplastic material, which presently are used in precision potentiometers. The material is applied, e.g., through "screen printing". It is also possible to adjust different resistance values (ohm/cm).

The layer 2 can also be made of semiconductor resistive plastics, produced of conducting pigment, e.g., MICA-PIGMENT (MERK Gmbh) or carbon pigment (carbon black or ketjen black from AKZO, NL). Even polyanelin dipped plastics, so-called PANI, in which the molecule chain forms conducting groups (NESTE OY, FI) can be used in the layer 2.

A pigment, dye or foil layer can be used for visualization objects. If the visualization medium 8 changes its optical characteristics (becomes translucent) due to the heat, a pigment layer can be provided under the visualization medium for visibility reasons. The dye layer, for example, can consist of fluorescent yellow, luminous material or glass beads (3M).

The thermoindicating layer, at room temperature, can be provided with a black, opaque layer, preferably based on pigments of micro-encapsulated floating crystals. When temperature increases above a preselected temperature for the pigment, the layers change to transparent, whereby the underlying layer, which may consist of strong luminous color, becomes visible. LCD-pigment normally does not change from black to transparent. It is normal to start from a shade, which, due to increased heat, becomes transparent. Thus, a black or dark background layer can be provided. To create black LCD-pigment at room temperature, one can, through known methods, mix different colors, so that their emission wavelengths interfere each other and become black (full absorption). A thin layer of some transparent ultraviolet absorber can be used as the surface layer to protect the underlying layer.

Figure 9B:
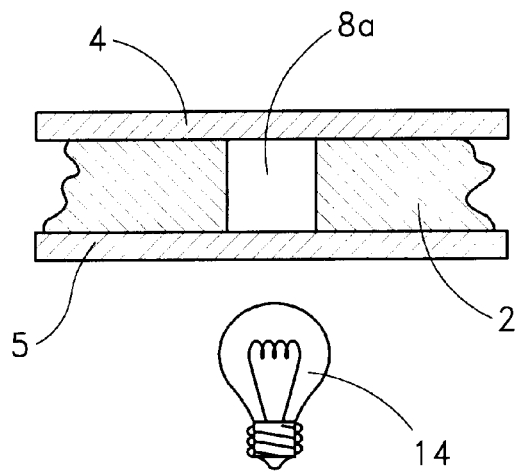

For certain applications, the embodiment according to FIG. 9b can be applicable, in accordance to which a temperature sensitive indication material 8a, e.g., stearin, is used in the bores of the resistant disc 2. The indication material due to the heat becomes transparent. The visualization is obtained by means of a light source 14 placed behind the matrix, which illuminates through the softened stearin. In this case, even the electrodes 4, 5 must consist of a transparent material. It also shows light dots in firm colors by illuminating a background color or gives the illumination a certain color, which is transmitted through the heated transparent dots.

Figure 10:
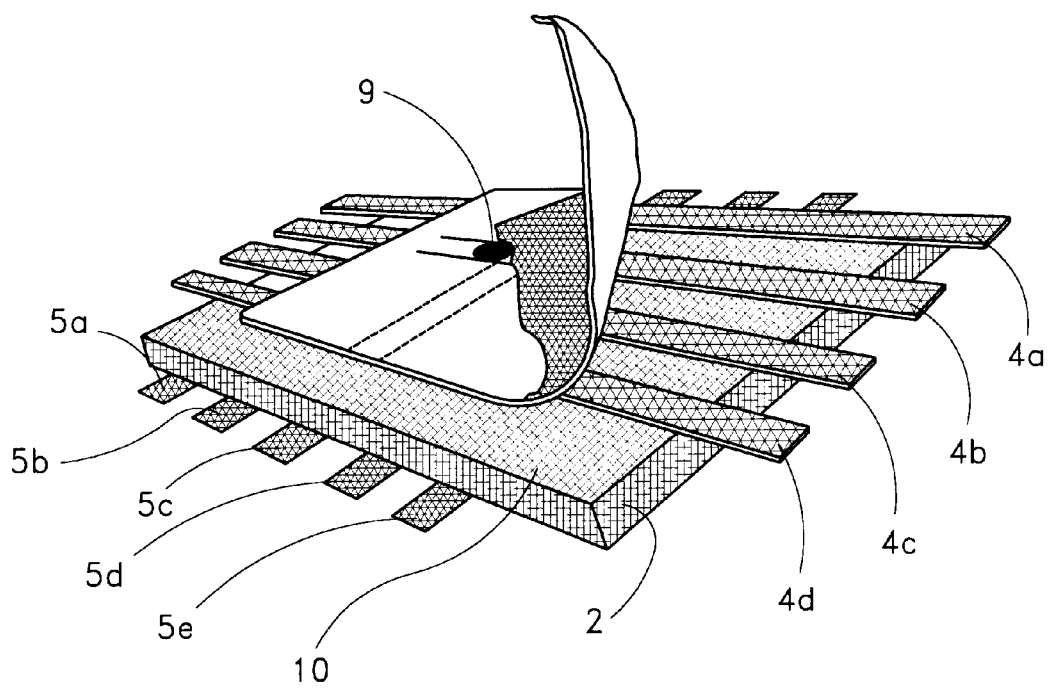
FIG. 10 shows a view, analogous to FIG. 1, of a modified embodiment.

According to a preferred embodiment shown in FIG. 10, the matrix 1 consists of a double-sided circuit board or film, where the board/substrate consists of a semiconductor material 2 and the electrodes on both sides of the board/substrate are of the printed circuit board type. The temperature sensitive indication material 8a is arranged in the visualization medium 8, which may be integrated within the matrix 1.

Figure 11:
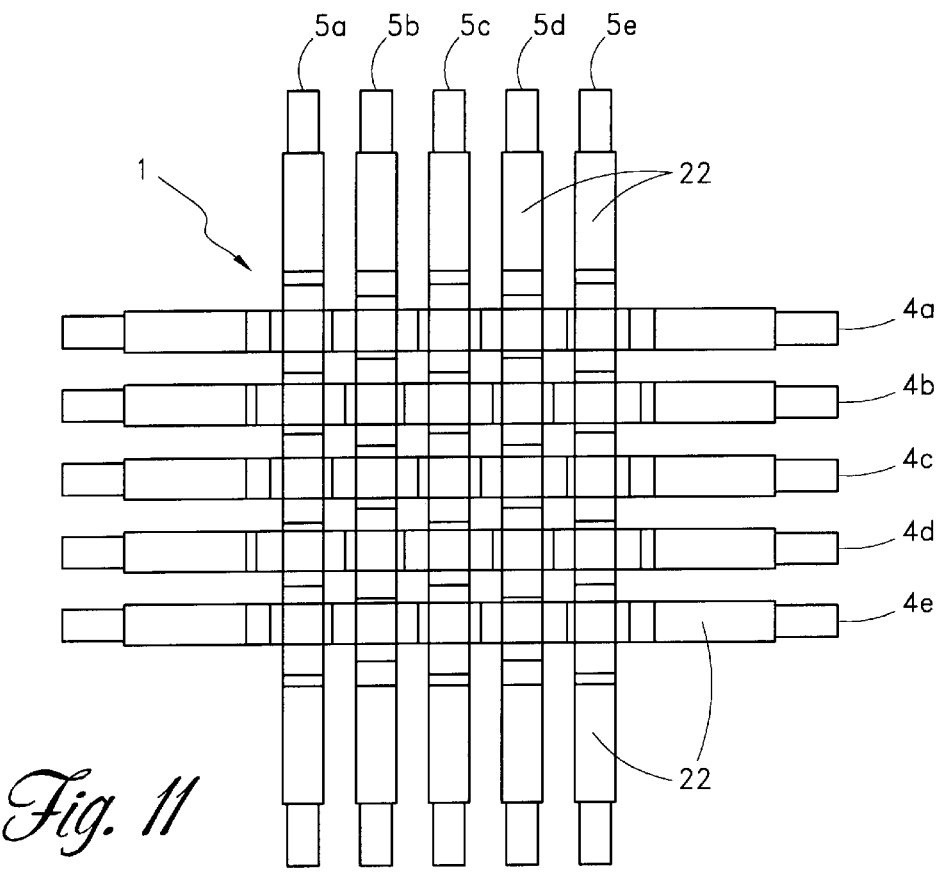
FIG. 11 shows an elevation view of a part of a matrix with woven design.
Figure 12:
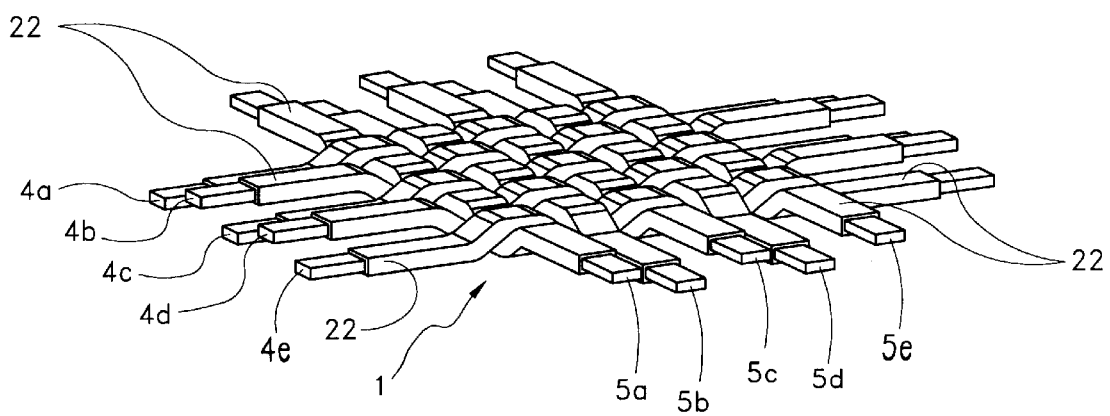
FIG. 12 shows in perspective the matrix disclosed in FIG. 11.

An additional embodiment is shown in FIGS. 11 and 12, where the matrix 1 consists of a web having conducting wires surrounded by a semiconductor coating 22. The wires form the electrodes 4, 5 of the matrix, whereby the electrodes in one set of the electrodes are provided in the warp direction of the web and the electrodes in the other set of the electrodes are in the weft direction of the web. The resistive spacers 2 consist of the semiconductor coating 22. With this embodiment, is possible to produce matrices in a simple and cheap way with very high resolution if thin wires (i.e., electrodes) are chosen.

Figure 15:
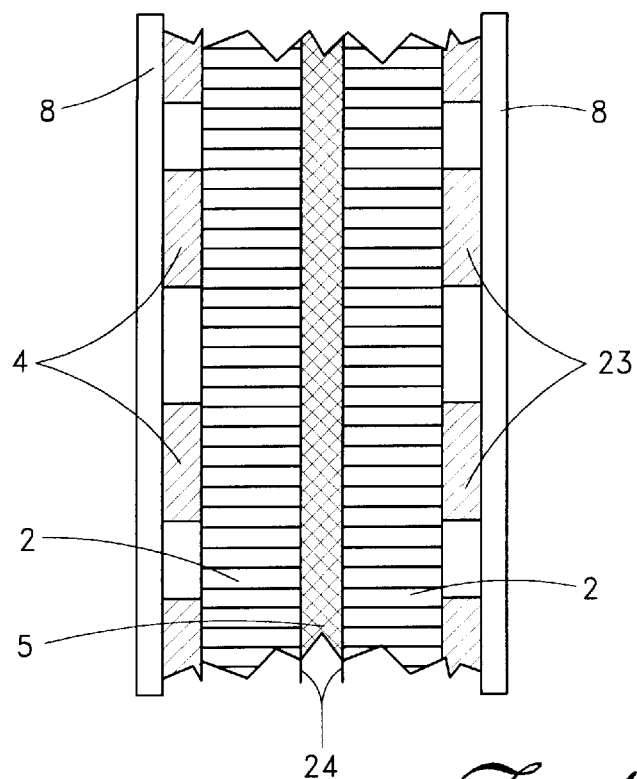
FIG. 15 shows, in perspective, an electrode matrix for a double-sided display.

FIG. 15 schematically shows a section through an embodiment consisting of three electrode layers 4, 5 and 23. By using such an embodiment, the display can be used for double-sided visualization of information. The resistive layer 2 is arranged between the electrode layers 4 and 5 and between the electrode layers 5 and 23. The visualization medium 8 is arranged on the electrode layers 4 and 23.

Figure 15A:
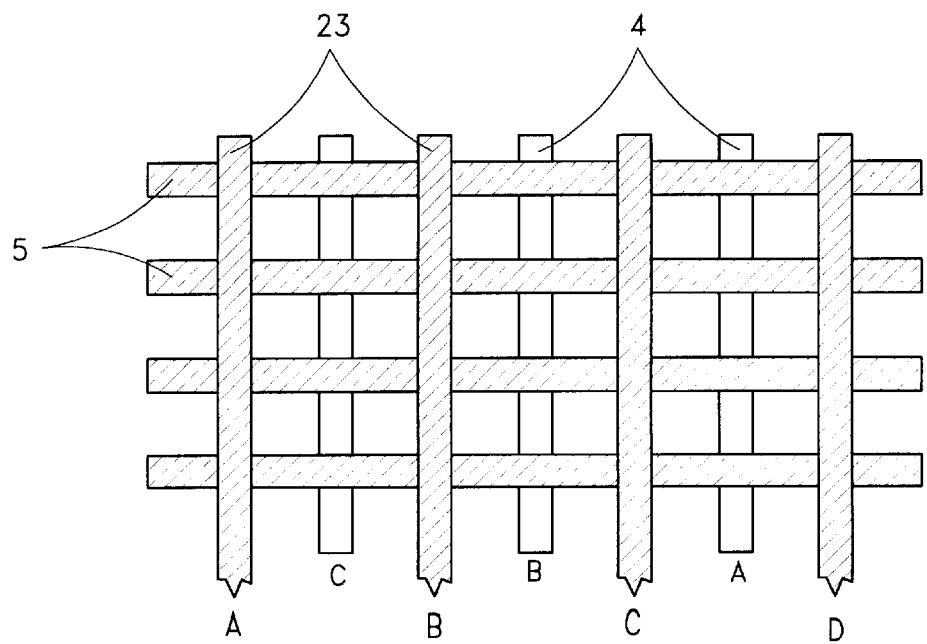
FIG. 15a shows, in plan view, the interconnection of the electrodes in the electrode matrix of FIG. 15.

To avoid the information when visualizing to become reversed on the opposite side of the display, the electrodes are connected according to FIG. 15a, where each electrode 4, for example, from right to left on one side of the display is connected to same control voltage as the electrodes 23 on the other side of the display, but from left to right. If translucent electrodes are used, one surface of the electrodes 5 or the heat generating layer can be covered with a color or pigment layer 24.

Figure 13:
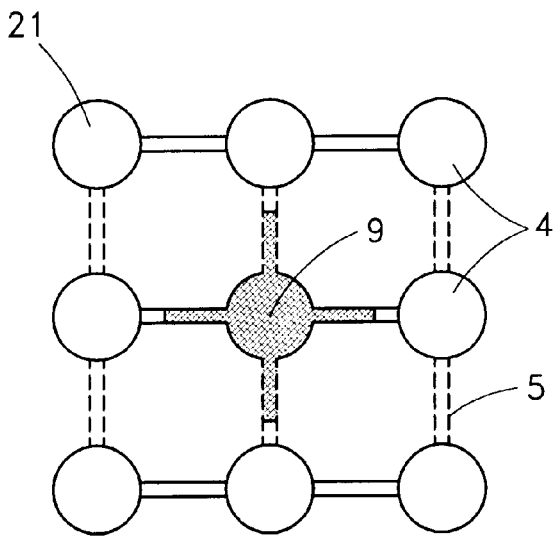
FIG. 13 shows in an elevation view of another embodiment showing a part of a matrix.
Figure 14:
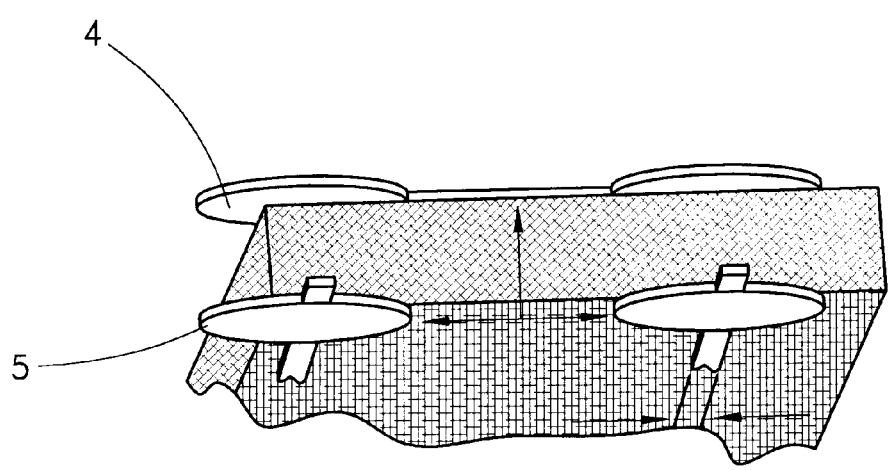
FIG. 14 shows, in perspective the part shown in FIG. 13.

To reduce the heat distribution through the matrix conductors 4 and 5, and to increase the contrast and extension of the hot dots, the matrix can be formed according to the embodiment shown in FIGS. 13 and 14. The matrix is made of very thin conductors connected to the connection plates 21.

Figure 17:
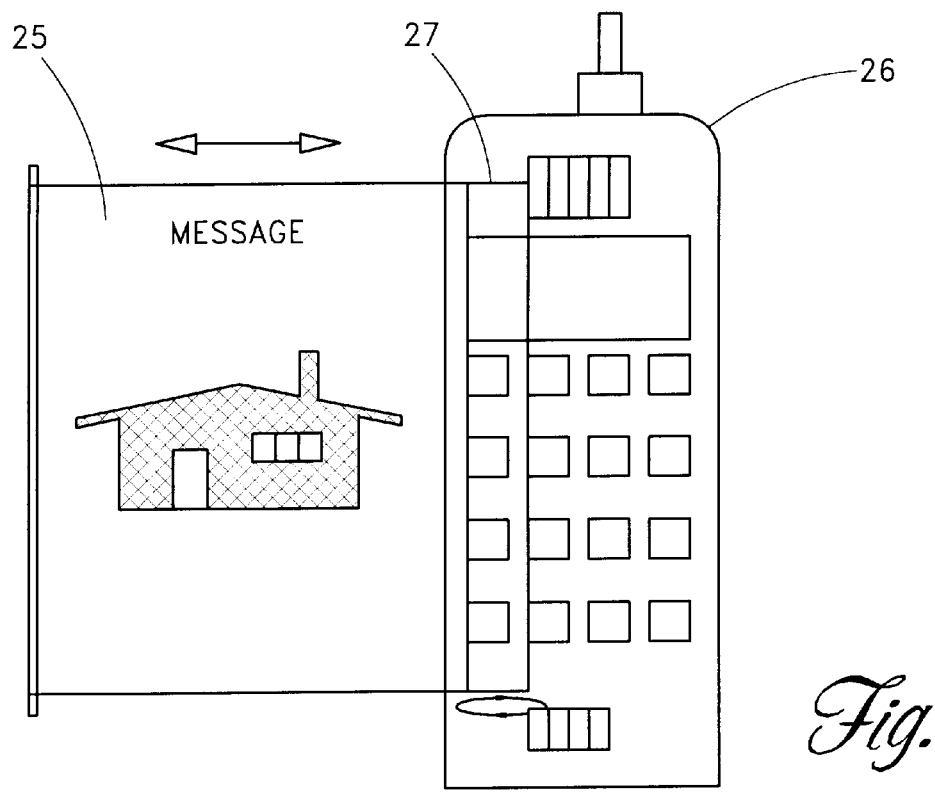
FIG. 17 shows an application of a display according to the invention in a mobile telephone.
Figure 17A:
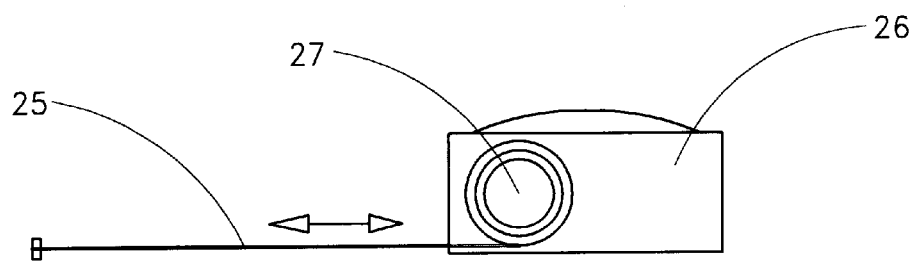

FIG. 17 shows a second application of a display unit according to the invention. The display 24 in this case consists of thin and flexible electrodes, for example, of semiconductor plastic or metallic stripes. Also the visualization medium and the resistive, heat generating layer are of some flexible material, which enables the display 25 to be wound in a roll 27, for example, inside a mobile telephone 26. The display 25 according to this embodiment can be used to receive long messages, drawings or the like. When a message package is read, the display 25 is rolled out. For example, a mobile telephone is provided with a facsimile receiver/transmitter, if a message with drawings/text is sent to the user of the portable/mobile telephone, the user can roll out the screen, read the message and store it on a thermopaper by pressing the paper against the screen. FIG. 17a shows a cross section through the telephone 26 according to FIG. 17 with a part of the display 25 wound up as a roll 27 inside the telephone.

The visualization does not have to be achieved only through heating of the dots. The entire display surface can be warmed up and the indication can occur through switching off (cooling) the areas to be visualized.

The screen can also be provided with base heating, i.e., the dots are warmed up to a certain threshold level, which causes faster "lighting" of the dots and thereby uses less energy and consumes less time.

During longer operation periods, the screen may be heated. The problem can be solved by using an efficient cooling, or by decreasing the amount of the supplied energy by measuring and adjusting the temperature. The temperature measurement can be provided through a special sensor unit or measurement of resistance alterations in the heat generating layer.

Figure 18:
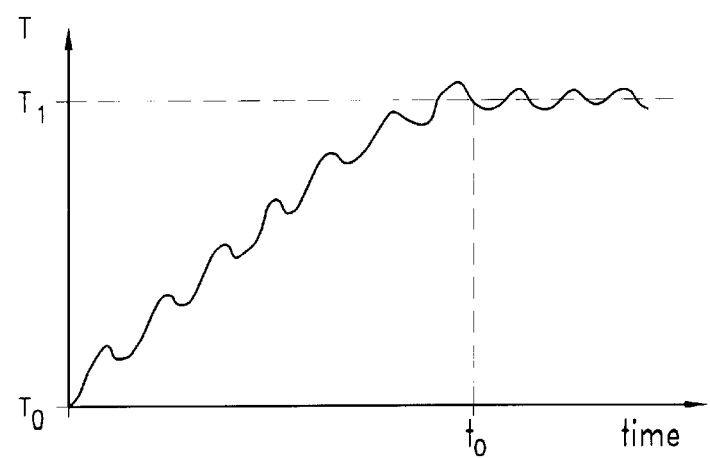
FIG. 18 is a graph showing a heating method according to the invention.

The temperature sensitive indication layer 8a is heated to any intermediate temperature between the temperature at which the indication layer 8a is fully transparent by means of controlling the amount of heat generated. The amount of heat generated is built up, during a heating phase, by sending a plurality of low voltage/short duration pulses of electric current to the individual electrode via the control means, and, when the desired temperature is reached, maintaining this temperature with pulses which are spaced apart further in time compared to the first build-up phase pulses, which procedure is represented in the diagram shown in FIG. 18. Each peak on the curve indicates a current pulse. To raise the temperature from $T_0$ to $T_1$, the temperature is held sufficiently constant by sending pulses less frequently. The control voltage to the electrodes can thus be pulsated, i.e., each selected crossing point is pulsated with an amount of energy per time unit, so that its heat remains substantially constant until the next screen update. Using this method, by modulating the pulse trains, there is no need to modulate the voltage to the electrodes. The pulsating can be done by addressing each point continuously with voltage and/or current pulses, switching on/off the dot by changing the dot address or multiplexing or scanning. The scanning of the matrix 1 can be performed either sequentially, i.e., each row of electrodes is scanned in sequence, or non-sequentially, when every $n^{th}$ row is scanned and then, after completing the whole display sheet, scanning every $n^{th}$ plus one row.

Figure 20A:
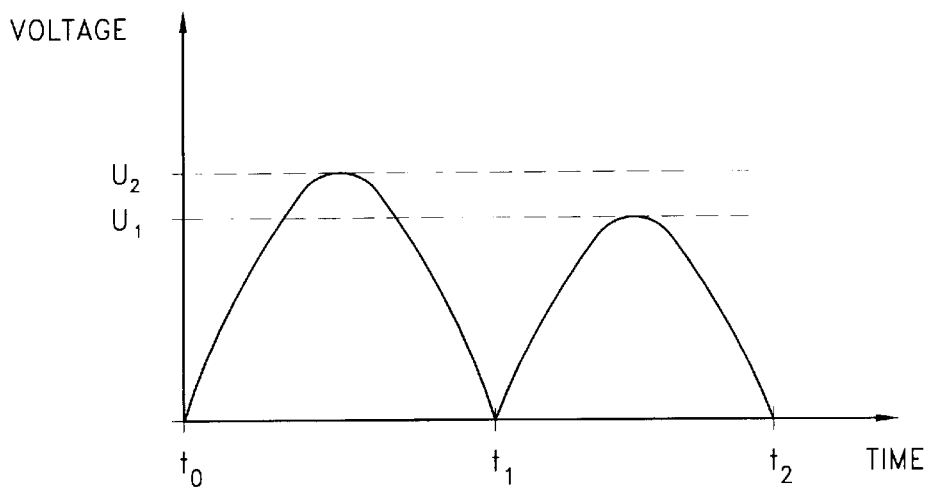
FIG. 20a is a graph showing voltage modulated pulses according to the invention.
Figure 20B:
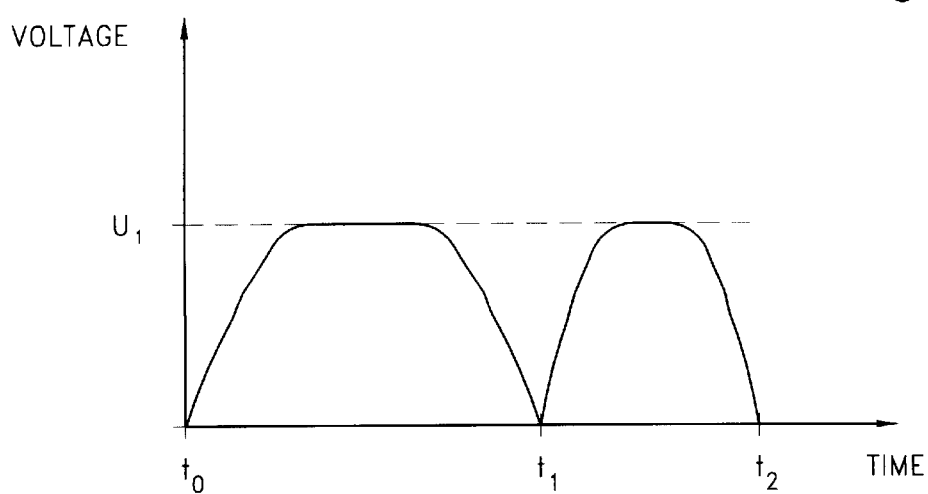
FIG. 20b is a graph showing duration modulated pulses according to the invention.

Alternatively, the pulse can be modulated by amplitude or pulse width, as is shown in FIGS. 20a and 20b. As is evident from FIG. 20a, two pulses of the same time duration, i.e., $t_1-t_0$ equals $t_2-t_1$, can have two different maximum pulse voltages, $U_1$ and $U_2$ respectively, whereby the energy given off as heat is controlled by varying the maximum pulse voltage. In FIG. 20b, an alternative method is shown in which two pulses have the same maximum pulse voltage, $U_1$, but have different durations, in the shown example $t_1-t_0$ is greater than $t_2-t_1$. The energy given off as heat is thus controlled by varying the pulse width, i.e., the time during which the voltage is fed through the matrix 1.

Figure 19:
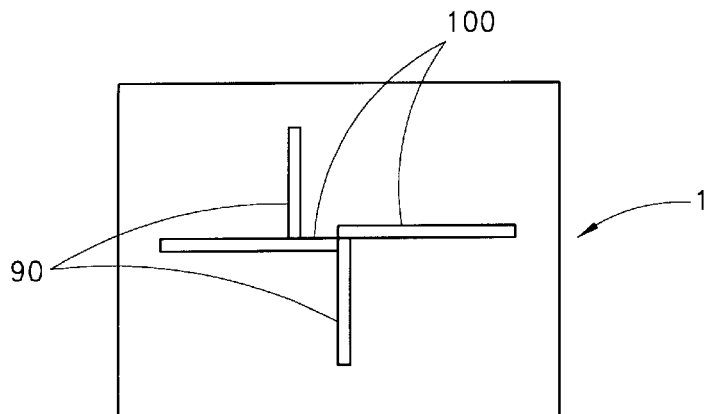
FIG. 19 is a plan view of the side of the matrix on which terminal strips are arranged.

To minimize current consumption, the electrode sets are fed electrical current from terminal points situated at a center section of the matrix 1, as is shown in FIG. 19. A preferred location is on the opposite side of the matrix 1 compared to where the indication layer 8a is arranged. Terminal strips 90 feed the first set of electrodes 4 and terminal strips 100 feed the second set of electrodes 5.

The information display devices, as previously described, are advantageously arranged as a multitude of information display devices, in one plane and with all devices facing the same direction with their respective indication layers, thus providing large size display boards all sharing the same image control device.

Although certain preferred embodiments have been shown and described, it should be understood that changes and modifications may be made thereto without departing from the scope of the appended claims.

What is claimed is:

1. A display for digital/analog visualization of computer stored and bitmapped still or moving images on or via at least one visualization medium, the display comprising:

a matrix comprising at least two sets of individually addressable electrodes, the electrodes being arranged in rows and columns with overlapping regions defined by the overlapping parts of a row and a column;

a set of at least two resistive spacers positioned in the overlapping regions and electrically connecting the sets of electrodes;

at least one control unit electrically coupled to said electrodes for applying, multiplexing, scanning or pulsating first and second control signals to the set of at least two resistive spacers via said electrodes to obtain a temperature variation in the overlapping regions; and a thermosensitive material covering the electrodes and transforming the temperature variation to a visible dot, wherein:
the control unit applies the first control signals comprising a plurality of low voltage and short duration pulses of electric current until the desired temperature is reached; and
the control unit intermittently applies the second control signals to the electrodes with an amount of energy per time unit to maintain the desired temperature, so that the visible dot remains until a next update of the display, wherein the second control signals are spaced apart further in time compared to the first control signals.

2. The display of claim 1, wherein the resistive spacers comprise an electrically resistive material.

3. The display of claim 1, wherein the resistive spacers comprise a semiconductor material.

4. The display of claim 1, wherein the resistive spacers have a reduced area between the electrodes.

5. The display of claim 1, wherein a heat conducting layer is arranged between the resistive spacers and the visualization medium.

6. The display of claim 1, wherein the resistive pacers extend over several electrodes in each set of electrodes.

7. The display of claim 1, wherein the electrodes within each row and column are arranged substantially parallel relative to each other, the rows of electrodes being substantially perpendicular to the columns of electrodes.

8. The display of claim 1, wherein the electrodes are embedded in the resistive spacers.

9. The display of claim 1, wherein the electrodes are transparent.

10. The display of claim 1, wherein the electrodes are produced by applying an electric conducting medium on the resistive spacers.

11. The display of claim 1, wherein each electrode in one set of the electrodes comprises an emitter arranged in a base and each electrode in the other set of the electrodes comprises a collector.

12. The display of claim 1, wherein said thermosensitive material comprises microencapsulated liquid crystals.

13. The display of claim 1, wherein the visualization medium comprises reversible temperature indicators.

14. The display of claim 1, wherein the visualization medium is transparent at a glassing transition temperature.

15. The display of claim 1, wherein the thermosensitive material is an integrated part of the resistive spacers, the thermosensitive material comprising microencapsulated liquid crystals embedded within a binding agent of semiconductor plastic.

16. The display of claim 1, wherein the thermosensitive material changes color at least within a part of the color spectrum during temperature changes, and wherein the control unit controls the voltage of the electrodes with respect to a temperature at which a certain desired color variation of the thermosensitive material occurs.

17. The display of claim 1, wherein the visualization medium is transparent when heated.

18. The display of claim 1, wherein the electrodes form a web of electrical conductors, and wherein the electrodes in one set of the electrodes are arranged in the warp direction of the web and the electrodes in the other set of the electrode are arranged in the weft direction of the web.

19. The display of claim 1, wherein the thermosensitive material comprises transparent thermoplastic material.

20. The display of claim 19, wherein the thermosensitive material comprises DIALLYL PHTHALATE.

21. The display of claim 19, wherein the thermosensitive material is applied by screen printing and is adjustable to different resistance values (ohm/cm).

22. The display of claim 1, wherein the display is a rollable, foldable, thin elastic material.

23. The display of claim 1, wherein the display is double-sided.

24. A telephone having a display for digital/analog visualization of computer stored and bitmapped still or moving images on or via at least one visualization medium, the display comprising:
a matrix comprising at least two sets of individually addressable electrodes, the electrodes being arranged in rows and columns with overlapping regions defined by the overlapping parts of a row and a column;
a set of at least two resistive spacers positioned in the overlapping regions and electrically connecting the sets of electrodes;
at least one control unit electrically coupled to said electrodes for applying, multiplexing, scanning or pulsating first and second control signals to the set of at least two resistive spacers via said electrodes to obtain a temperature variation in the overlapping regions; and
a thermosensitive material covering the electrodes and transforming the temperature variation to a visible dot,
wherein:
the control unit applies the first control signals comprising a plurality of low voltage and short duration pulses of electric current until the desired temperature is reached; and
the control unit intermittently applies the second control signals to the electrodes with an amount of energy per time unit to maintain the desired temperature, so that the visible dot remains until a next update of the display, wherein the second control signals are spaced apart further in time compared to the first control signals.

25. The telephone of claim 24, wherein the telephone is a mobile telephone.

26. The telephone of claim 24, wherein the display is in rolled form.

27. A display for digital/analog visualization of computer stored and bitmapped still or moving images on or via at least one visualization medium, the display comprising:
a matrix comprising at least two sets of individually addressable electrodes, the electrodes being arranged in rows and columns with overlapping regions defined by the overlapping parts of a row and a column;
one or more resistive spacers positioned in the overlapping regions to separate the sets of electrodes and to electrically connect one or more sets of electrodes, wherein at least one set of electrodes is embedded in the resistive spacers;
at least one control unit electrically coupled to said electrodes for applying, multiplexing, scanning or pulsating first and second control signals to the one or more resistive spacers via said electrodes to obtain a temperature variation in the overlapping regions; and
a thermosensitive material covering the electrodes and transforming the temperature variation to a visible dot,
wherein:
the control unit applies the first control signals comprising a plurality of low voltage and short duration pulses of electric current until the desired temperature is reached; and
the control unit intermittently applies the second control signals to the electrodes with an amount of energy per time unit to maintain the desired temperature, so that the visible dot remains until a next update of the display, wherein the second control signals are spaced apart further in time compared to the first control signals.

28. A display for digital/analog visualization of computer stored and bitmapped still or moving images on or via at least one visualization medium, the display comprising:

a matrix comprising at least two sets of individually addressable electrodes, the electrodes being arranged in rows and columns with overlapping regions defined by the overlapping parts of a row and a column;

one or more resistive spacers positioned in the overlapping regions to separate the sets of electrodes and to electrically connect the sets of electrodes;

at least one control unit electrically coupled to said electrodes for applying, multiplexing, scanning or pulsating first and second control signals to the one or more resistive spacers via said electrodes to obtain a temperature variation in the overlapping regions;

a thermally conductive material covering the electrodes and the one or more resistive spacers; and a thermosensitive material covering the thermally conductive material and transforming the temperature variation to a visible dot, wherein:
the control unit applies the first control signals comprising a plurality of low voltage and short duration pulses of electric current until the desired temperature is reached; and the control unit intermittently applies the second control signals to the electrodes with an amount of energy per time unit to maintain the desired temperature, so that the visible dot remains until a next update of the display, wherein the second control signals are spaced apart further in time compared to the first control signals.

29. A display for digital/analog visualization of computer stored and bitmapped still or moving images on or via at least one visualization medium, the display comprising:

a matrix comprising at least two sets of individually addressable electrodes, the electrodes being arranged in rows and columns with overlapping regions defined by the overlapping parts of a row and a column, wherein at least one set of electrodes has an annulus shape in the overlapping regions;

a set of at least two resistive spacers positioned in the overlapping regions and electrically connecting the sets of electrodes;

at least one control unit electrically coupled to said electrodes for applying, multiplexing, scanning or pulsating first and second control signals to the set of at least two resistive spacers via said electrodes to obtain a temperature variation in the overlapping regions; and a thermosensitive material covering the electrodes and transforming the temperature variation to a visible dot, wherein:
the control unit applies the first control signals comprising a plurality of low voltage and short duration pulses of electric current until the desired temperature is reached; and the control unit intermittently applies the second control signals to the electrodes with an amount of energy per time unit to maintain the desired temperature, so that the visible dot remains until a next update of the display, wherein the second control signals are spaced apart further in time compared to the first control signals.

\* \* \* \* \*

UNITED STATES PATENT AND TRADEMARK OFFICE
CERTIFICATE OF CORRECTION

PATENT NO. : 6,229,514 B1                           Page 1 of 1
DATED : May 8, 2001
INVENTOR(S) : Ove Larson It is certified that error appears in the above-identified patent and that said Letters Patent is hereby corrected as shown below:

<u>Claim 1,</u>
Line 6, change "pacers" to -- spacers --

Signed and Sealed this

Eighteenth Day of December, 2001

Attest:

*Attesting Officer*

JAMES E. ROGAN
*Director of the United States Patent and Trademark Office*